(12) United States Patent
Skelt

(10) Patent No.: US 8,219,319 B2
(45) Date of Patent: Jul. 10, 2012

(54) WORKFLOW FOR PETROPHYSICAL AND GEOPHYSICAL FORMATION EVALUATION OF WIRELINE AND LWD LOG DATA

(75) Inventor: Christopher Skelt, Houston, TX (US)

(73) Assignee: Chevron U.S.A. Inc., San Ramon, CA (US)

(*) Notice: Subject to any disclaimer, the term of this patent is extended or adjusted under 35 U.S.C. 154(b) by 215 days.

(21) Appl. No.: 12/642,632

(22) Filed: Dec. 18, 2009

(65) Prior Publication Data

US 2011/0208431 A1 Aug. 25, 2011

(51) Int. Cl.
G06F 19/00 (2011.01)
(52) U.S. Cl. ......... 702/7; 702/6; 702/9; 702/11; 702/13; 702/14; 703/6; 703/7; 73/7; 73/152.11; 73/152.18; 175/50; 367/27; 367/31
(58) Field of Classification Search .................. 702/6, 7, 702/8, 9, 11, 13, 14, 39; 703/2, 6, 7, 9, 10, 703/38; 73/38, 152.48, 152.05, 152.02, 152.11, 73/579, 597, 152.59, 152.18, 7; 175/39, 175/40, 50, 59, 24; 367/27, 30, 31, 32, 35
See application file for complete search history.

(56) References Cited

U.S. PATENT DOCUMENTS

| | | | | |
|---|---|---|---|---|
| 4,502,121 | A | * | 2/1985 | Clavier et al. .................... 702/13 |
| 4,786,873 | A | * | 11/1988 | Sherman ........................ 324/323 |
| 4,833,914 | A | | 5/1989 | Rasmus |
| 5,126,939 | A | * | 6/1992 | Carpentier et al. ............. 702/11 |
| 5,282,384 | A | | 2/1994 | Holbrook |
| 6,021,377 | A | * | 2/2000 | Dubinsky et al. .................. 702/9 |
| 7,168,310 | B2 | * | 1/2007 | Al-Ruwaili ................ 73/152.18 |
| 7,196,517 | B2 | | 3/2007 | Freedman |

(Continued)

FOREIGN PATENT DOCUMENTS

EP 1795921 6/2007

OTHER PUBLICATIONS

Christopher Skelt, Fluid substitual in laminated sands, The Leading Edge, 2004, pp. 485-483.
Fritz Gassmann, On Elasticity of Porous Media, Translated from Vierteljahrsschr Naturfosch. Ges. Zurich, 1996, No. 1, pp. 1-21 (1951).
Interactive Petrophysics, Laminated Fluid Substitution, User Documentation, Senergy Ltd., Version 3.5, 2009.
Christopher Skelt, Response equations—how and why?, Advances in Petrophysics:5 Years of Dialog, Jan. 1996, pp. 51-55.

(Continued)

Primary Examiner — Carol Tsai
(74) Attorney, Agent, or Firm — Carlos L. Hanze

(57) ABSTRACT

A computer-implemented method of characterizing elastic properties of a subsurface formation at various fluid saturation conditions is disclosed. The method includes the features of estimating densities and bulk moduli of fluids and surrounding rock matrix material present in an invaded zone around a wellbore and beyond the invaded zone to record a set of log curves of density and bulk modulus of the fluids and the surrounding rock matrix material present in the invaded zones and beyond the invaded zone versus depth; recording a set of shale trend compaction curves in each wellbore; solving a set of response equations for rock and fluid volumes based on the recorded set of log curves and shale trend compaction curves to compute lithology, porosity and hydrocarbon saturation to build computer models to estimate hydrocarbon saturation for the rock matrix material penetrated in the wellbore; and using the estimated densities and the bulk moduli of the fluids and the rock matrix material near the wellbore, the shale trend compaction curves and the computed lithology, porosity and hydrocarbon saturation near the wellbore to characterize elastic properties of a subsurface formation at various fluid saturation conditions.

35 Claims, 6 Drawing Sheets

U.S. PATENT DOCUMENTS

| | | | |
|---|---|---|---|
| 7,373,251 B2 * | 5/2008 | Hamman et al. | 702/14 |
| 7,830,744 B2 * | 11/2010 | Wu et al. | 367/31 |
| 2006/0136162 A1 * | 6/2006 | Hamman et al. | 702/104 |
| 2009/0145600 A1 * | 6/2009 | Wu et al. | 166/250.02 |
| 2010/0326669 A1 * | 12/2010 | Zhu et al. | 166/369 |
| 2011/0015907 A1 * | 1/2011 | Crawford et al. | 703/2 |

OTHER PUBLICATIONS

J. Quirein, et al., A Coherent Framework for Developing and Applying Multiple Formation Evaluaion Models, SPWLA Twenty-Seventh Annual Logging Symposium, Jun. 9-13, 1986, pp. 1-17.

* cited by examiner

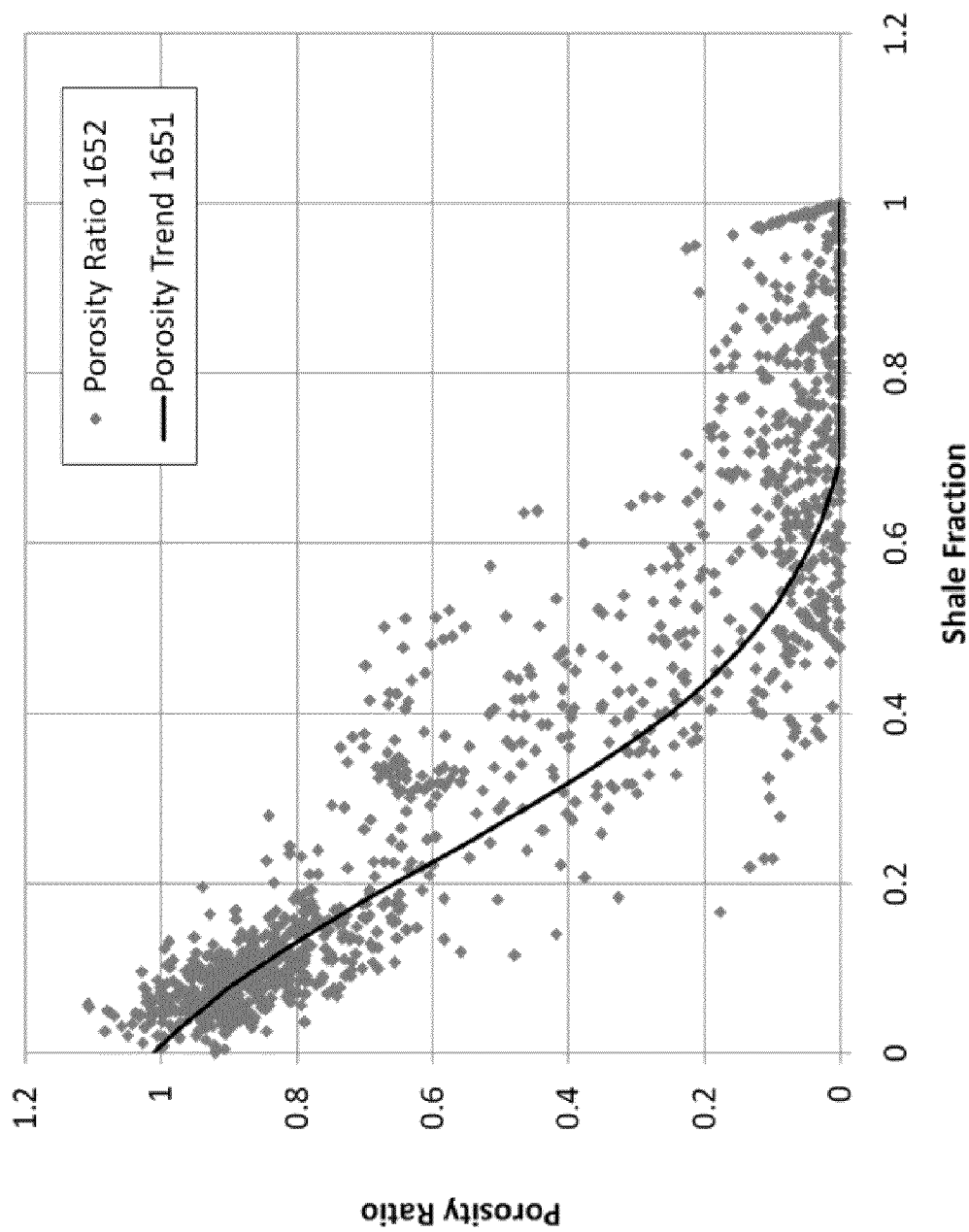
Figure 2, Estimating Porosity Ratio from Shale Fraction

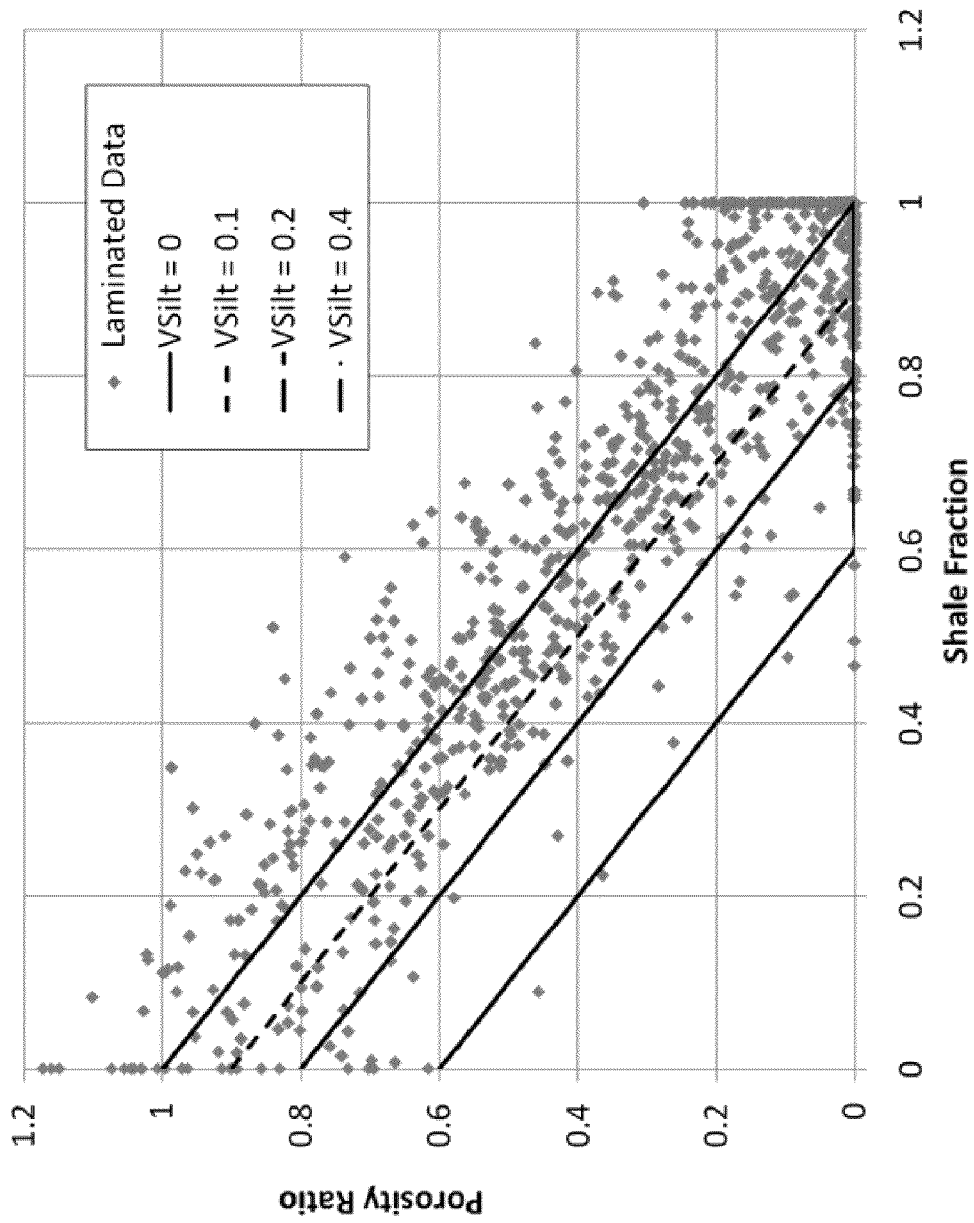

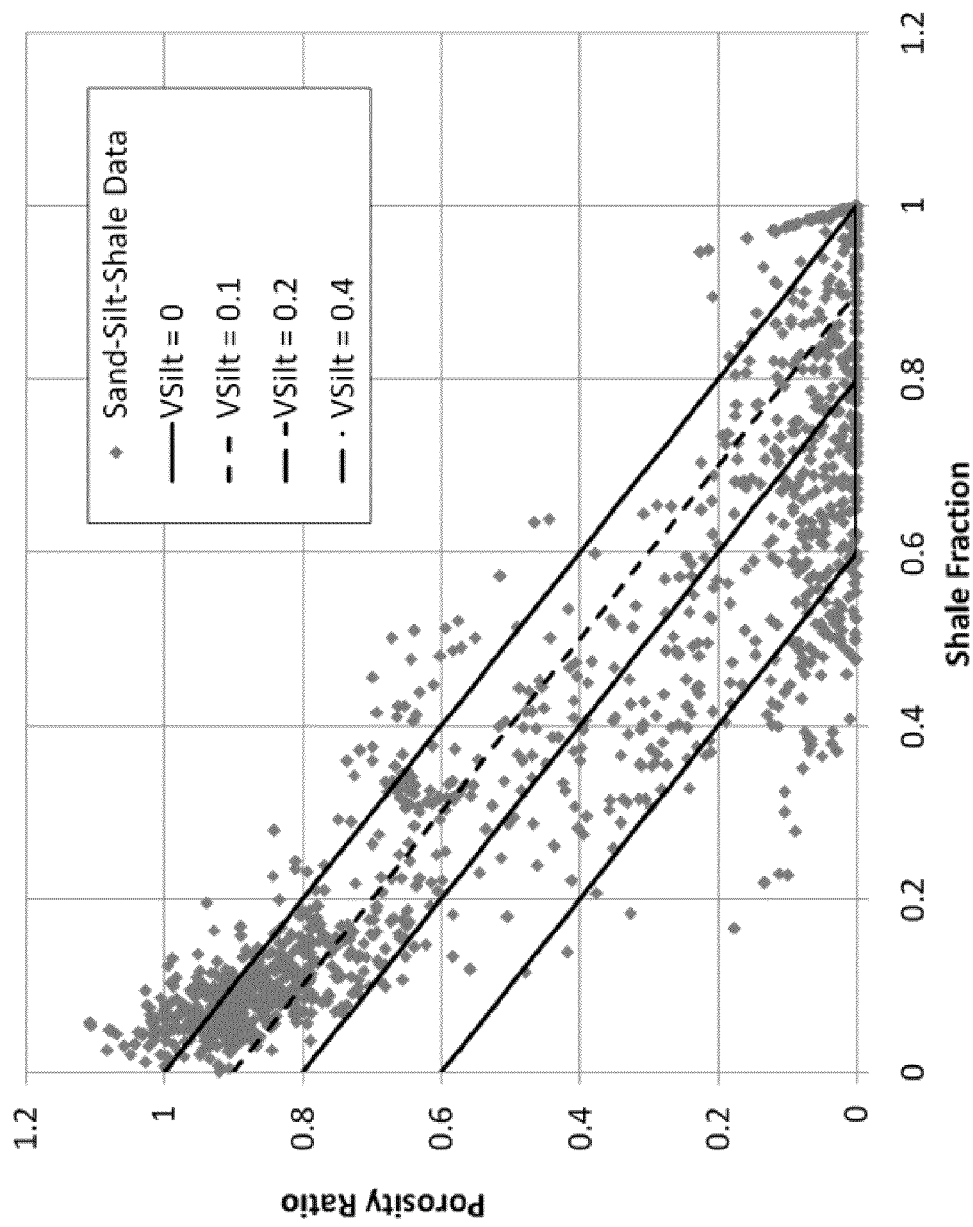

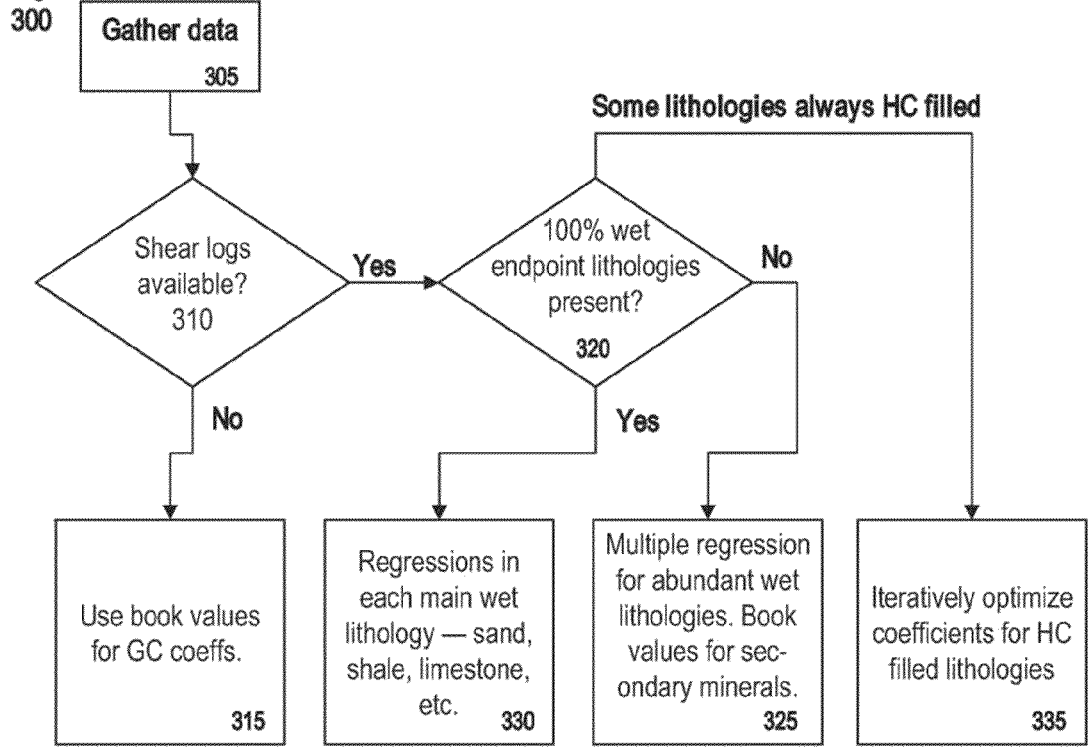

WORKFLOW FOR PETROPHYSICAL AND GEOPHYSICAL FORMATION EVALUATION OF WIRELINE AND LWD LOG DATA

FIELD OF THE INVENTION

The present invention relates generally to processing of geological data and more particularly to a computer-implemented method for petrophysical and geophysical formation evaluation of wireline and logging-while-drilling (LWD) log data.

DESCRIPTION OF THE RELATED ART

The geology of a borehole may be evaluated using borehole logging tools. Measurements of various properties of the subsurface formations through which the borehole penetrates can be made, and a log of the measurements against depth is produced. This borehole data can be collected via a number of techniques including resistivity/conductivity measurements, acoustics, ultrasound, NMR, and gamma radiation, for example. Generally, borehole data is analyzed by human interpreters in order to characterize a subsurface geological formation to allow decisions to be made regarding commercial potential of the well or to determine information about the nature of the surrounding geologic area. Borehole data of this type may be used to replace or supplement the collection of cores for visual inspection and measurements in the laboratory.

Geophysicists often use log data and interpreted results supplied by a petrophysicist as input to tasks such as well-seismic ties, models of Amplitude as a function of Offset (AVO) models, seismic inversion and estimation of reservoir properties from seismic attributes. The computer-implemented method presented in this disclosure is designed to streamline the petrophysicist's task of preparing data for the geophysicist's use, reduce the geophysicist's workload, avoid duplication of effort and impose consistency between the two disciplines.

SUMMARY OF THE INVENTION

Aspects of embodiments of the present disclosure provide a computer-implemented method of characterizing elastic properties of a subsurface formation at various fluid saturation conditions, the method comprising estimating densities and bulk moduli of fluids and surrounding rock matrix material present in an invaded zone around a wellbore and beyond the invaded zone to record a set of log curves of density and bulk modulus of the fluids and the surrounding rock matrix material present in the invaded zones and beyond the invaded zone versus depth; recording a set of shale trend compaction curves in each wellbore; solving a set of response equations for rock and fluid volumes based on the recorded set of log curves and shale trend compaction curves to compute lithology, porosity and hydrocarbon saturation to build computer models to estimate hydrocarbon saturation for the rock matrix material penetrated in the wellbore; and using the estimated densities and the bulk moduli of the fluids and the rock matrix material near the wellbore, the shale trend compaction curves and the computed lithology, porosity and hydrocarbon saturation near the wellbore to characterize elastic properties of a subsurface formation at various fluid saturation conditions.

Aspects of embodiments of the invention may include a computer-readable medium encoded with computer-executable instructions for performing the foregoing method or for controlling the foregoing system.

Aspects of embodiments of the invention may include a system configured and arranged to provide control of the system in accordance with the foregoing method. Such a system may incorporate, for example, a computer programmed to allow a user to control the device in accordance with the method, or other methods.

Projects involving petrophysical-geophysical integration typically include from a few to a few tens of wells. When working with this number of wells it is normal for the user to give each well individual attention to verify data consistency with the data set as a whole, and to scan each well's results as part of quality control.

The computer-implemented method as described below in various aspects of the present invention is used when sufficient log data is available to make a fit for purpose petrophysical interpretation in geological environments where the Gassmann equation, described further below, is valid. These are principally clastic and mixed lithology oil and gas reservoirs. The method may be applied from top to bottom of the logged interval wherever sufficient wireline and LWD data are available. Some wells typically have partial or no shear sonic log coverage. In these cases, the shear slowness (the reciprocal of the shear wave velocity) can be estimated using locally derived parameters simultaneously with fluid substitution, described further below.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various FIGS. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates an example for computing porosity in accordance with various aspects of the present disclosure FIGS. 3a and 3b illustrate an example approach for silt estimation in accordance with various aspects of the present disclosure.

FIG. 4 illustrates an example of a computer-implemented method using the Greenberg-Castagna model in accordance with an embodiment of the present invention.

DETAILED DESCRIPTION OF THE INVENTION

In a given region of an exploration area, there may be a large number of wells drilled. Some wells are drilled with the intention that they will be production wells, others are for fluid injection, or for exploration, delineation or appraisal purposes. During, or after, drilling of each well, one or more well logs may be recorded, measuring properties of the subsurface formations through which they are drilled.

Geophysicists base their modeling on trend curves extracted from log data to characterize variations in elastic and reservoir properties with depth. Consistency is achieved between the two disciplines by the petrophysicist deriving these trends early in the method, using them for the petrophysical analysis, and passing them to the geophysicist as part of the result package. If the zone of interest is small enough vertically that compaction effects are insignificant, trend curves can be replaced by constant numbers. Petrophysical analysis starts with standard multi-well data analysis, including the use of cross-plots to help identify inconsistencies in tool calibration, consistency or otherwise of earth trends, and their relation to depth below ocean bottom or sea level and different geo-pressure regimes from well to well.

Figure 1:
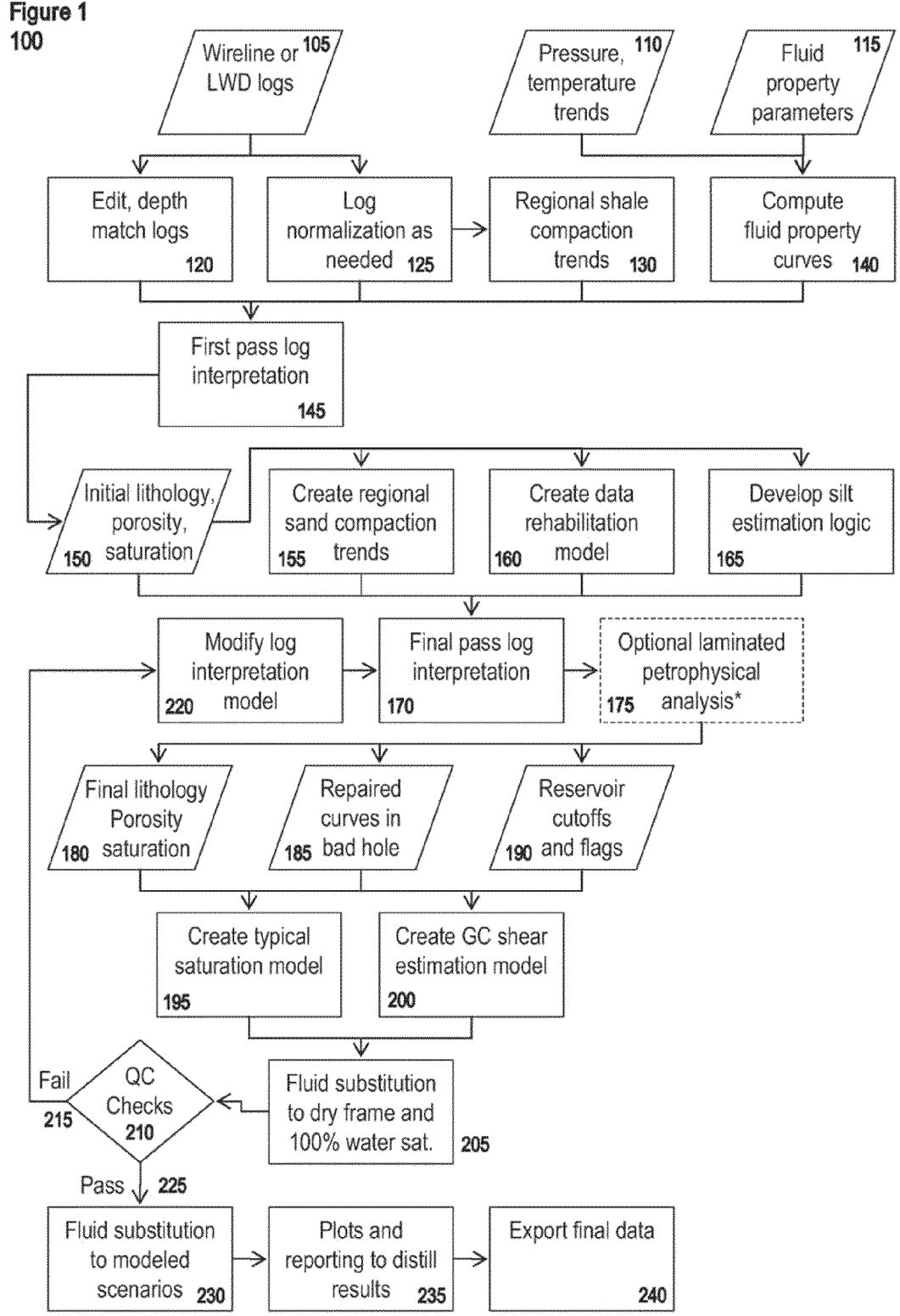
FIG. 1 illustrates an example of a computer-implemented method in accordance with an embodiment of the present invention.

FIG. 1 illustrates an example computer-implemented method in accordance with an embodiment of the present invention. The method, indicated generally at 100, begins at 105 by loading wireline and logging-while-drilling (LWD) logs into a software program, such as a petrophysical applications package. At 120, logs curve intervals that may have erroneous data may be erased, and consecutive runs are spliced to maximize vertical coverage. Log curves may be depth matched, and borehole corrections may be made as appropriate. Borehole corrections are the amount by which a log measurement must be adjusted in order to remove the contribution of the borehole. For example, in resistivity logging, the correction removes the contribution from the borehole from the measured signal, and in nuclear logging, the correction adjusts the reading to that which would be found in a standard condition, such as a borehole of a given diameter filled with fresh water at a standard temperature. Resolution enhancement techniques may be used to improve the accuracy of the logs where beds are identified but not fully resolved. The resolution of the logs used for compositional petrophysical analysis may be matched as much as possible to avoid spurious bed boundary effects in the computed results.

In some aspects, the method may be optimized for datasets comprising from a few to a plurality of wells. It may be equally applied to a single well without the steps concerned with well to well consistency. The maximum number of wells may be determined by the need to give some individual attention to each well.

At this stage of the method, sonic logs in deviated wells, which are wellbores intentionally drilled away from vertical, should be corrected for the effects of anisotropy. Sonic logs are a type of acoustic log that records travel time of P-waves and S-waves (also called compressional and shear waves, respectively) versus depth. For example, sonic logs are typically recorded by pulling a tool on a wireline up the wellbore. The tool emits a sound wave that travels from the source to the formation and back to several receivers mounted on the tool.

Deviated wells may have anisotropic formations where various properties of the formations, such as permeability and stress, may be directionally dependent. For example, most shale formations are made up of fine laminations with differing elastic properties, and have different stiffness, and therefore velocity, parallel and perpendicular to the bedding. If the sonic logs are not corrected for anisotropy, they should be used with caution or not at all. After the sonic logs are corrected for anisotropy, sampled curves are ready for input to a petrophysical compositional analysis application.

In some aspects, the interpreted interval may be maximized. This often involves working with limited logging suites, such as gamma ray and resistivity only, in the overburden. The method may be able to solve for lithology, porosity and saturation using limited log data supplemented by earth trends. The same capability also enables reconstruction of the density and compressional sonic logs where they are absent or affected by adverse borehole conditions.

In some aspects, continuous elastic logs (density and sonic) and log analysis results from top to bottom of the interpreted interval may be needed, and so this data may need to be synthesized over intervals where the logs are absent or erroneous. Since synthetic data should not be used for developing interpretive insights or trends, it is necessary to identify and distinguish "original" raw data from the final curves that may be spliced hybrids of recorded and synthetic data.

Formation pressure and temperature trends and fluid data such as formation water salinity, oil gravity and gas-oil ratio, gas gravity and invading filtrate properties at 110 and 115 are needed for petrophysical evaluation and fluid substitution. Moreover, bulk moduli of rocks in and around the invaded zone are also needed for fluid substitution. For example, properties from pressure and temperature trends and basic salinity, gas-to-oil ratio (GOR) and/or gravity inputs may be used to estimate the fluid property trends using programs such as the Colorado School of Mines/University of Houston FLAG application. Alternatively, laboratory measurements of fluid property samples may be used.

The method at 140 then yields fluid property curves versus depth in the wells representing the density and bulk modulus of the fluids present in the invaded and undisturbed zone, and the properties of any hypothetical fluids to be used for subsequent modeling based the fluid property trends of 140.

The method continues at 130 by taking the edited, depth-matched and/or normalized logs to produce a set of shale trend compaction curves or density trends in each well, where shale property trends may be defined with respect to a common datum and set up in each well. The set of curves are typically density, neutron, compressional sonic and resistivity versus depth. The data may dictate a single trend for the region, or separate trends for each well, or groups of wells. Mis-calibrated logs may be identified at this stage. For example, if the sonic, neutron and resistivity logs of the well in question follow a regional trend defined by several wells, but the density is displaced, it may be shifted to normalize at 125. Any normalized log curves produced at this step may supersede the log curves at step 105.

A first pass log interpretation is then performed at 145 based on the regional shale compaction trends determined at 130 and the computed fluid property curves of 140. The first pass computes an initial lithology, porosity and/or saturation at 150. Based upon these computed parameters, a regional sand porosity compaction trend is created at 155, a data rehabilitation model is created at 160 and a silt estimation logic is developed at 165. The method runs iterative passes until a final pass log interpretation is performed at 170. In some aspects, a log interpretation model that explicitly quantifies the fluids present in the invaded zone allows for a sense check on the petrophysical analysis and enables fluid substitution to adjust the recorded logs by removing invasion effects and represent the earth's properties at the well location.

In some aspects, silt quantification is a useful visual cue for distinguishing interbedded sand-shale intervals with porous sand laminations from hard silty intervals, and for better understanding the variation of elastic properties with lithology. Even where the earth is mineralogically binary (sand-clay), it is often ternary in acoustic properties (sand-silt-shale). In these circumstances, compressional impedance may correlate better with computed silt fraction than with sand or shale fraction.

In some aspects, shear slowness may be needed for fluid substitution, but is not usually available over the entire interval of interest in all the wells. Shear slowness is estimated using an iterative Gassmann/Greenberg-Castagna optimization built into the fluid substitution program, discussed further below.

Density logs record the apparent density of the near wellbore formation, not its true bulk density. This is due to characteristics of the measurement physics and the tool calibration. Elastic properties of the earth are related to the true bulk density. Determining the volume and properties of the water, oil, gas and invading drilling fluid filtrate sensed by the tool as explicit invaded zone fluid saturation enables easy conversion from apparent to true bulk density.

The method continues by computing initial lithology, porosity and hydrocarbon saturation of the rock formation in and around the borehole. A general set of log response equations are solved for rock and fluid volumes. The log response equations are a set of equations that are solved simultaneously by a computer program, transforming a set of log curves and properties assigned to a suite of rock, mineral and fluid components to a set of volumetric fractions of the formation components. Table 1, shown below, lists typical response parameters for a simple analysis of a formation into shale, sand, water and oil using four recorded logs including gamma ray, density neutron porosity and conductivity, plus the implied unity equation that states that the four volumes sum to one. This is an overdetermined set of equations for which the solution is arrived at by a mathematical optimization, such that if one of the inputs were missing, a solution would still be possible with the remaining four equations and four unknowns.

TABLE 1

Typical response parameters for a simple analysis of a formation into shale, sand, water and oil using four recorded logs including gamma ray, density neutron porosity and conductivity, plus the implied unity equation

| Input Name | Symbol | Units | Shale | Sand | Oil | Water |
|---|---|---|---|---|---|---|
| Unity | 1 | | 1 | 1 | 1 | 1 |
| Gamma Ray | GR | API Units | 120 | 40 | 0 | 0 |
| Density | $\rho$ | g/cm$^3$ | 2.7 | 2.65 | 1 | 0.7 |
| Neutron | $\phi_N$ | fraction | 0.3 | 0 | 1 | 1 |
| Conductivity | Ct | mS | 0 | 0 | 0 | 10000 |

The API units identified in Table 1 represents a unit of radioactivity used for natural gamma ray logs. This unit is based on an artificially radioactive concrete block at the University of Houston, Tex., USA, that is defined to have a radioactivity of 200 American Petroleum Institute (API) units. The response parameters may be used in the following set of simultaneous equations, shown as equation set 1, to solve for the volume fractions of shale, oil and water.

$$1 = V_{Shale} + V_{Sand} + V_{Oil} + V_{Water}$$

$$GR = 120 \times V_{Shale} + 40 \times V_{Sand} + 0 \times V_{Water} + 0 \times V_{Oil}$$

$$\rho_b = 2.7 \times V_{Shale} + 2.65 \times V_{Sand} + 1 \times V_{Water} + 0.7 \times V_{Oil}$$

$$\phi_N = 0.4 \times V_{Shale} + 0 \times V_{Sand} + 1 \times V_{Water} + 1 \times V_{Oil}$$

$$Ct^{0.5} = 0 \times V_{Shale} + \times V_{Sand} + C_{Water}^{0.5} \times V_{Water} + 0 \times V_{Oil} \quad (1)$$

Property inputs can be constants or trend curves, and the solid fraction can be made up of a combination of "rocks" such as shale and "minerals" such as orthoclase. The log curves from 120 and 125 and the property trends from 110 and 115 above are used as inputs to compute the lithology, porosity and hydrocarbon saturation of the rock formation in and around the borehole.

In addition to miscellaneous quality control curves, computation results relevant to subsequent fluid substitution include the following parameters. A first parameter includes frame by frame rock and mineral volume fractions that together with porosity sum to one. These are passed to the fluid substitution application as rock and mineral inputs. A second parameter includes total and effective porosity and bound water volume fractions. A third parameter includes saturations of fluids in the invaded and undisturbed zones referenced to total or effective porosity. Total or effective invaded zone connate water, filtrate and hydrocarbon saturations are thus available for input to the fluid substitution application.

"Output" curves can be used reconstructed using mathematical techniques such as linear superposition of volumes and response parameters. For example, if the density log is absent or affected by bad hole conditions, it would not be used to compute the volume fractions. It would instead be reconstructed from the computed volume fractions using the response equations shown above as equation 2. This response equation is the same as the $\rho_b$ equation from equation set 1.

$$\rho_b = 2.7 \times V_{Shale} + 2.65 \times V_{Sand} + 1 \times V_{Water} + 0.7 \times V_{Oil} \quad (2)$$

The reconstructed logs may be used in circumstances where density is absent or affected by a bad hole and, is therefore, not used in the analysis. Moreover, "output" curves may also be used to generate a "true" as distinct from an "apparent" bulk density log. This feature also allows the user to combine minerals (for example sandstone=quartz+orthoclase+plagioclase) to simplify the fluid substitution rock model.

In some aspects, the general set of log response parameters for rock and fluid volumes may be optimized for a preselected number of key wells selected to maximize comprehensive good quality log and core data and vertical coverage.

Typical clean sand porosity compaction trends are derived at 155 from the results of the computed initial lithology, porosity and hydrocarbon saturation of the rock formation in and around the borehole using a combination of statistical and visual data analysis techniques. For example, common statistical data analysis techniques include finding the "best fit line" (linear, polynomial, exponential, logarithmic, etc.) that minimizes the measured data residuals. Data residuals are the differences between an original data point and the estimated data point using the formula of the "best fit line." The minimization of the data residuals can be done in a variety of ways; for example, least squares or absolute value. Visually an expert may also draw a line which he feels best represents the relationship between two different variables cross-plotted against each other. A visually drawn relationship can then be reduced to a numeric formula to be used in further analysis. Alternatively, the expert could divide the data in a series of continuous depth bins and pick an average or median value of the log data within each depth bin. This resulting data can then be interpolated using a method such as a spline fitting process. The statistical or visual data analysis may be done on the totality of the data set, or subdivided into data ranges to better follow the trends in the data. In some aspects, several wells may be used to derive regional trends. In some aspects, regional trends may be defined well by well. These trends have two purposes which include estimating elastic log (density and sonic) properties where the logs are absent by creating a data rehabilitation model 160 and using the clean sand porosity trend as an input to develop a silt estimation logic 165.

The data rehabilitation model 160 fills in missing log data, in particular density, compressional sonic and computed porosity, by using previously found relationships between these particular data types, including the regional sand porosity compaction trend model 155, the regional shale compaction trend 130 and available well log data (e.g., resistivity and gamma ray) in the missing well log data interval. The missing well logging curves may be because of a lack of initial recording of the well logging data, or deletion of these data during the quality control portion of this method (step 120). The data rehabilitation model 160 enables a volumetric analysis in intervals with very limited data, for example resistivity and gamma ray only, and predicts logs such as density to overwrite intervals where the original log is absent or poor quality. These models may be run on all wells.

For example, porosity computation is heavily dependent on the density log, and the density log is also an important component of the elastic behavior of the formation. If the density log was not run or was unusable due to adverse hole conditions, an alternative method is needed for computing porosity, and the formation density also needs to be estimated. FIG. 2 illustrates an example approach for computing porosity in accordance with various aspects of the present disclosure and shows porosity ratio variations relative to shale fraction. As shown in FIG. 2, "porosity ratio" is plotted on the y-axis and is the ratio of computed effective porosity to the typical clean sand porosity from the sand porosity compaction trend, or $\varphi_{Ratio} = \varphi_{Effective}/\varphi_{Typical}$. FIG. 2 shows a trend that is a sigmoidal line fit enabling porosity ratio to be computed from shale fraction (that can be reliably estimated without the need for a density log). Effective porosity is then estimated as $\varphi_{Effective} = \varphi_{RatioEstimated} \times \varphi_{Typical}$. At this point water saturation $S_w$ may be computed from resistivity, porosity and shale fraction, and the volume fractions of hydrocarbon and water in the porosity determined Referring to the example in paragraphs [0028]-[0031], the density log may then be estimated using $$\rho_b(\text{Estimated}) = \rho_{Shale} \times V_{Shale} + \rho_{Sand} \times V_{Sand} + \rho_{Hydrocarbon} \times V_{Hydrocarbon} + \rho_{Water} \times V_{Water}$$

where $V_{Hydrocarbon} = \varphi_{Effective} \times (1 - S_{Water})$, $V_{Water} = \varphi_{Effective} \times S_{Water}$ and $V_{Sand} = 1 - V_{Shale} - \varphi_{Effective}$. The result of this exercise is a continuous estimated porosity and density log that may be used to fill gaps where the density log was unavailable. Similar reasoning may be applied to other log types.

Implementing the optional silt estimation logic 165 provides the analyst with a visual indication of the variation in porosity with shale fraction that, in turn, is a useful indicator of whether the interval in question should be characterized as a sand-silt-shale sequence where the logs are fully resolving the beds and interpreted using the interpretation model 170, or whether it is better characterized as a laminated interval requiring the laminated petrophysical analysis 175. Effective porosity, loosely the hydraulically connected part of the total porosity that contributes to formation permeability, typically reaches a maximum defined by compaction and diagenesis in shale free sands, and reduces to zero in shales. FIGS. 3a and 3b illustrate an example development of silt estimation logic 165. "Porosity ratio" plotted on the y-axes is the ratio of computed effective porosity to the typical clean sand porosity from the sand porosity compaction trend, or $$\varphi_{Ratio} = \frac{\varphi_{Effective}}{\varphi_{Typical}}.$$

In the laminated example shown in FIG. 3a, effective porosity varies linearly between the sand and shale inputs because the formation is made up of unresolved shale and porous sand laminations. Porosity reduction occurs more rapidly as shale fraction increases in the sand-silt-shale example as shown in FIG. 3b. In this non-limiting example, silt fraction plotted as contours on the two plots is determined from shale fraction and porosity ratio using the formula $V_{Silt} = 1 - V_{Shale} - \varphi_{Ratio}$. Note that in this context silt fraction is a visual indicator of porosity loss with respect to shale fraction, not the term often understood by geologists who define silt according to the rock's grain size range. The created regional sand compaction trends 155, the created data rehabilitation model 160 and the developed silt estimation logic 165 is then fed back to compute a subsequent log interpretation until the final log interpretation is performed at 170.

Finally, the interpreted log results may be manually edited, to allow the analyst to override the computed results where he judges that his understanding of the formation enables him to improve upon the computed values yielded by the log interpretation program. Two illustrative, non-exhaustive examples are now described. First, spurious low hydrocarbon saturations, typically a few percentage points, are often sporadically computed in intervals that are known to be 100% water filled. The analyst would overwrite the computed saturations with 100% water saturation and 0% hydrocarbon saturation. Second, certain geological conditions give rise to the presence of low saturation immovable or (colloquially) "fizz" gas in a porous and permeable rock formation, typically present over tens or hundreds of vertical feet. Variations in the hydrocarbon saturations computed using resistivity-based saturation equations may be inconsistent with the relatively constant indications of saturation indicated by the recorded compressional velocity. Because modeled fluid effects are very dependent on saturation at low gas saturations, it behooves the analyst to overwrite the computed results with, for example, a constant saturation equal to the average computed from the log interpretation model. A representative fizz zone water saturation is 0.85.

An optional laminated reservoir petrophysical analysis for sand lamination porosity, saturation and net to gross ratio may be performed beginning at 175. Oil and gas reservoirs in some geological environments such as deep water turbidites are made up of thin stacked beds that are not individually distinguished by the logs. This has led to the development of petrophysical interpretation practices specifically for finely laminated reservoirs. In cases where the project team chooses to use laminated reservoir concepts in the earth model, the corresponding petrophysical analysis results may be used for fluid substitution in place of more conventional volumetric formation compositional analysis.

Laminated reservoirs for this purpose have individual sand and shale beds that are not resolved by standard logs. This means that the logs indicate average properties of the formation over several feet. This necessitates an alternative approach to formation evaluation where the petrophysicist uses laminated reservoir models to quantify the sand and shale lamination fractions, and the inherent properties—porosity, fluid saturation and mineralogy or lithology—of the sand laminations. This analysis may be additional to or instead of the analysis of 170.

The laminated analysis begins at 175 by taking the final lithology, porosity and saturation determined at 170 and passing to 180. Logging curves (e.g., electrical, acoustic, NMR, density, etc.) recorded from bad holes are repaired at 185 and cutoffs or flags used to identify intervals where fluid substitution is not to be done are identified at 190. The data of 180, 185 and 190 are used to create typical saturation model at 195 and to create a Greenberg-Castagne (GC) shear estimation model at 200. The Greenberg-Castagna shear estimation model allows for the estimation of the shear wave velocity based on the compressional wave velocity and shale volume. The resulting "shale lamination fraction," at 175, sand lamination porosity and fluid saturations are passed to the fluid substitution application at 205. Typical hydrocarbon-filled water saturation is estimated using, for example, trend lines from plots of computed water saturation against (for example) effective porosity or shale fractions. These are used generate a function to estimate "typical water saturation" of hydrocarbon bearing intervals and for estimating elastic properties for the hydrocarbon filled case.

Fluid substitution exercises generally include modeling the elastic properties of water bearing intervals in the hypothetical case that they were hydrocarbon filled. This requires the estimation of typical saturations for the rock properties in question by reference to the values observed in known hydrocarbon bearing zones. By plotting the computed water saturation against the effective porosity for hydrocarbon filled reservoirs from several wells, a curve may be fit that reproduces the hydrocarbon filled trend in accordance with various aspects of the present disclosure. The curve Sw_Typ is then the modeled hydrocarbon filled saturation.

The resulting curve may be clipped at a minimum of 0.85, for example, to represent typical saturations for modeling a "fizz" scenario. This step produces two curves named (for example) Sw_Typ and Sw_Fizz. Sw_Typ represents a "typical" water saturation for the hydrocarbon filled reservoir as outlined in the paragraph above. Sw_Fizz represents an essentially constant saturation of trapped or immobile gas.

Greenberg-Castagna coefficients, discussed further below, are determined for shale and wet sand. Most datasets include at least several wells with good quality measured shear data through sands, shaley sands and shales. The choice of strategy for deriving local Greenberg-Castagna (GC) coefficients depends on the availability of shear and compressional data in shales and clean water bearing sands.

FIG. 4 illustrates an example scheme 300 for applying the Greenberg-Castagna model 200 in diverse scenarios in accordance with an embodiment of the present invention. At 305, data including all data preceding 200 of FIG. 1 is gathered. At 310, a determination is made as to whether shear logs are available. In the absence of recorded shear data from the wells in question or from suitable analogs, the analyst can use, for example, values presented below in paragraphs [0061]-[0064] below at 315. If shear logs are available, a determination is made at 320 as to whether 100% wet endpoint lithologies are present. If the determination made at 320 is no, then multiple regression are performed for abundant wet lithologies and book values for secondary minerals are used at 325. If the determination made at 320 is yes, then regressions in each main wet lithology—sand, shale, limestone, etc. is performed at 330. If the determination made at 320 is that some lithologies are always hydrocarbon (HC) filled, then coefficients for HC filled lithologies are iteratively optimized at 335.

If there are well defined shales and shale-free wet sands, coefficients are defined by regression through each. If the wet sands are all shaley, the user solves simultaneously for sand and shale coefficients by rearranging the GC equation as a multiple regression problem. If there are no wet sands with shear data, the user optimizes the coefficients by running the fluid substitution program. Default library or regional coefficients may be used if no shear data are available.

Fluid substitution and shear prediction application are run. In the general case where both the laminated and evenly distributed shale models are to be run, and some shear slowness estimation is to be done, the fluid substitution application needs the following inputs including density and bulk modulus trends for each fluid and their individual saturations, volume fractions, bulk moduli, and GC coefficients for each rock component, volume fraction, density, compressional slowness and GC coefficients for laminated shale, cutoffs or flags to identify intervals where fluid substitution is not to be done, bulk density, and compressional slowness.

In some aspects, shear slowness may be used as an input to the fluid substitution application. If available, it can be used in the fluid substitution application, and may also be used to validate the shear estimation model 200. Shear slowness data, which is a reciprocal of velocity and having units of time/distance, may be used in many areas such as to identify the rock strength, shear failure, direction of stresses, and other geomechanical parameters involved in wellbore integrity. It is also valuable in conjunction with the compressional slowness when pore pressure prediction models are built to manage drilling through overpressured zones and avoid borehole collapse and drilling fluid loss to the formation. In geophysical applications, the shear slowness allows estimating values of Poisson's ratios that are used to generate AVO (amplitude versus offset) models for hydrocarbon identification or in ties with seismic.

Quality control checks are performed at 210 on the fluid substitution to dry frame and 100% water saturation of 205. If the quality control fails, as shown at 215, then the method goes back to 220 to modify the log interpretation model. If the quality control passes, as shown at 225, fluid substitution is modeled under different saturation and/or fluid-type scenarios at 230. Plots and reports are made, discussed further below, based on the various fluid substitution models at 235, and finally data may be exported at 240.

As discussed above, petrophysicists and geophysicists do "fluid substitution" to estimate the density and sonic velocity of porous rocks at various saturation conditions with fluids such as gas, condensate and oil. In some aspects, the reservoir fluid properties may be estimated using laboratory measurements of the pressure-temperature-volume and phase response of fluid samples from the reservoir. In some aspects, the reservoir fluid properties may be estimated using a published correlation. For example, water density may be estimated from pressure, temperature and salinity. Moreover, the oil bulk modulus may be estimated from pressure, temperature, oil density, gas oil ratio, and the density of the dissolved gas. Programs such as the FLAG program from the Colorado School of Mines industry funded consortium may be used.

Theoretical rock physics models, which are aimed at describing relations between measurable seismic parameters and rock-fluid properties, are primarily continuum mechanics approximations of the elastic, viscoelastic or poroelastic properties of rocks. Elastic models, such as transformations, include models such as the Gassmann relations for fluid substitution, which are relatively free of geometric assumptions. The Gassmann relations relate the measured elastic parameters at one fluid state and predict the elastic parameters at another fluid state. The Gassmann equation can be used to solve for the dry frame bulk modulus, $K_{df}$, which can be represented as $$K_{df} = \frac{K_b\left(\frac{\phi}{K_f} + \frac{1-\phi}{K_r}\right) - 1}{\frac{\phi}{K_f} + \frac{1-\phi}{K_r} - \frac{2}{K_r} + \frac{K_b}{K_r^2}} \quad (3)$$

where $K_b$ is the whole formation bulk modulus, $K_r$ is the rock material bulk modulus, $K_f$ is the fluid bulk modulus and $\phi$ is the porosity.

The Gassmann equation may also be used to solve for the whole frame bulk modulus, $K_b$, and be represented as $$K_b = K_{df} + \frac{\left(1 - \frac{K_{df}}{K_r}\right)^2}{\frac{\phi}{K_f} + \frac{1-\phi}{K_r} - \frac{K_{df}}{K_r^2}} \quad (4)$$

Alternatively, the Gassmann equation may be represented as $$\frac{K_b}{K_r - K_b} = \frac{K_{df}}{K_r - K_{df}} + \frac{K_f}{\phi(K_r - K_f)} \quad (5)$$

Greenberg and Castagna have given empirical relations for estimating $V_s$ from $V_p$ in mixed lithology, brine-saturated rocks based on empirical, polynomial $V_p$-$V_s$ relations derived for endpoint lithologies. For each single lithology, they estimate $V_s = a_{i2}V_p^2 + a_{i1}V_p + a_{i0}$, where $V_p$ is the water-saturated P-wave velocity, and $V_s$ is the predicted water-saturated S-wave velocity and both $V_p$ and $V_s$ are expressed in km/s. The shear-wave velocity in brine-saturated composite lithologies is estimated by a simple average of the arithmetic and harmonic means of the constituent pure-lithology shear velocities, and may be expressed as:

$$v_s = \frac{1}{2}\left\{\left[\sum_{i=1}^{L} F_i \sum_{j=0}^{N_i} a_{ij} v_p^j\right] + \left[\sum_{i=1}^{L} F_i \left(\sum_{j=0}^{N_i} a_{ij} v_p^j\right)^{-1}\right]^{-1}\right\} \quad (6)$$

where $\sum_{i=1}^{L} F_i = 1$, L=number of endpoint lithologic constituents, $F_i$=volume fractions of lithological components, $a_{ij}$=empirical (linear or quadratic) regression coefficients, $N_i$=order of polynomial for constituent i and $v_p$, $v_s$=P and S-wave velocities (km/s) in composite brine saturated, mixed lithology rock. In practice, it is the mean of linear superposition in the velocity and slowness domains.

The Greenberg-Castagna formula may be expressed explicitly for the case of a mixed sandstone, limestone, dolomite and shale rock (denoted by subscripts SS, LS, Dol and Shale for the fractions F) as below as Eq. 7

$$v_s = 0.5 \times \begin{bmatrix} F_{SS} \times (a_{SS}v_p^2 + b_{SS}v_p + c_{SS}) + F_{LS} \times (a_{LS}v_p^2 + b_{LS}v_p + c_{LS}) + \\ F_{Dol} \times (a_{Dol}v_p^2 + b_{Dol}v_p + c_{Dol}) + \\ F_{Shale} \times (a_{Shale}v_p^2 + b_{Shale}v_p + c_{Shale}) \end{bmatrix} +$$

$$0.5 \times \left[\frac{F_{SS}}{(a_{SS}v_p^2 + b_{SS}v_p + c_{SS})} + \frac{F_{LS}}{(a_{LS}v_p^2 + b_{LS}v_p + c_{LS})} + \frac{F_{Dol}}{(a_{Dol}v_p^2 + b_{Dol}v_p + c_{Dol})} + \frac{F_{Shale}}{(a_{Shale}v_p^2 + b_{Shale}v_p + c_{Shale})}\right]^{-1}$$

where $F_{SS} + F_{LS} + F_{Dol} + F_{Shale} = 1$

TABLE 2

Typical published regression coefficients for a, b and c for Eq. 7

| Rock type | a (quadratic) | b (linear) | c (constant) |
|---|---|---|---|
| Sandstone | 0.000 | 0.804 | −0.856 |
| Limestone | −0.055 | 1.017 | −1.030 |
| Dolomite | 0.000 | 0.583 | −0.078 |
| Shale | 0.000 | 0.770 | −0.867 |

Table 2 shows typically good default values (regression coefficients) for a, b and c. As indicated above, the Greenberg-Castagna's monomineralic lithological components sum to 1. However, petrophysical analysis yields total rocks plus porosity summing to 1. The method is configured to transform "log analysis" volume fractions $V_{rock}$ of the whole rock to "Greenberg-Castagne-type" fractions of the solid part of the formation $F_{Solid}$ by using the following expression where $\phi$ denotes porosity:

$$F_{Solid} = \frac{Vol_{rock}}{1 - \phi} \quad (8)$$

Shear slowness may be estimated using a shear sonic curve or may be predicted using a Gassmann/Greenberg-Castagna iteration. Sonic reproduction quality is assessed by standard statistical analysis by comparing predicting shear with the recorded log in wells where it is present. For example, the shear prediction may be validated in wells not used to estimate the GC coefficients.

It cannot be assumed that the first attempt at building a fluid substitution model is definitive, so systematic quality control pointing to refinement of the model is an important aspect of the method. Quality control (QC) at 210 may be used to identify shortcomings in the petrophysical analysis of 150 or 175 and either indicate how to remedy it, or illustrate the need for changes to fluid substitution parameters or model.

Initial QC involves verifying successful removal of the original saturation imprint from the elastic properties after substitution to the 100% brine saturated condition, and accurate reproduction of the shear slowness in all lithologies and fluid saturation conditions. Typical QC crossplots made in addition to depth plots include the following plots including density, shear slowness, bulk modulus, compressional slowness or velocity, compressional impedance and compressional to shear or Poisson's ratio against effective porosity or shale fraction, colored by original water saturation, predicted shear slowness against observed, colored by shale fraction and fluid saturation to show that the imprint of the original fluid saturations has been successfully removed from the results.

All of the above plots are made for individual wells, and also as multi-well plots, to illustrate well to well consistency. The observed logs and 100% brine saturated results are displayed on the same plot to indicate the magnitude and consistency of observed and modeled fluid effects.

The method allows modification of the model in a number of ways, including toggling between the laminated and shaley sand models and altering the mixing laws for solids and fluids between the serial and parallel endpoints. Sometimes the cause of inconsistencies is not immediately apparent, and more detailed inspection is needed. The method at 210 allows a pre-built QC plot template to display more QC and diagnostic outputs, such as the elastic properties of the sand laminations, and the dry frame Poisson's ratio and bulk modulus.

The behavior of the Gassmann-derived dry frame bulk modulus may be benchmarked against other models, in particular the Critical Porosity, Krieff and the Hertz-Mindin/Hashin-Shtrikman soft, intermediate and stiff sand models.

At the same time, fluid substitution can be run to estimate elastic properties at actual in-situ reservoir saturations. This step adjusts the observed logs to compensate for invasion, and yields invasion compensated results that should be used for well ties or any other applications that need as inputs the properties of the reservoir, without invasion effects, at the well location.

Finally, fluid substitution may be run to modeled saturation scenarios, such as filling all reservoir sands with hydrocarbon at representative saturation, or a low gas ("fizz") saturation, using the typical saturation curves developed in 195 above. Results are plotted versus depth, and added to the initial set of QC crossplots. The observed logs should be similar to the 100% brine saturated logs in wet intervals, and to the hydrocarbon filled modeled results in hydrocarbon-bearing intervals. They are not identical because of invasion effects.

The method may output at 240 data including QC plots, plots of various elastic properties against depth or reservoir properties. The exported data may include one or more identifiers that indicate whether the log curves are recorded or estimated. The method may also output the following: property trends such as shale density and other elastic properties, and typical clean sand porosity by well or for the region, usually defined relative to mean sea level or ocean bottom, rock and fluid volumes from the petrophysical analysis, including any volume fractions for combined minerals, total and effective porosity and invaded and undisturbed zone saturations, and a set of elastic properties (density, compressional and shear sonic, impedance, Vp/Vs ratio, bulk modulus, shear modulus, etc.) corresponding to observed, 100% brine saturated, invasion corrected and various modeled fluid scenarios.

Figure 5:
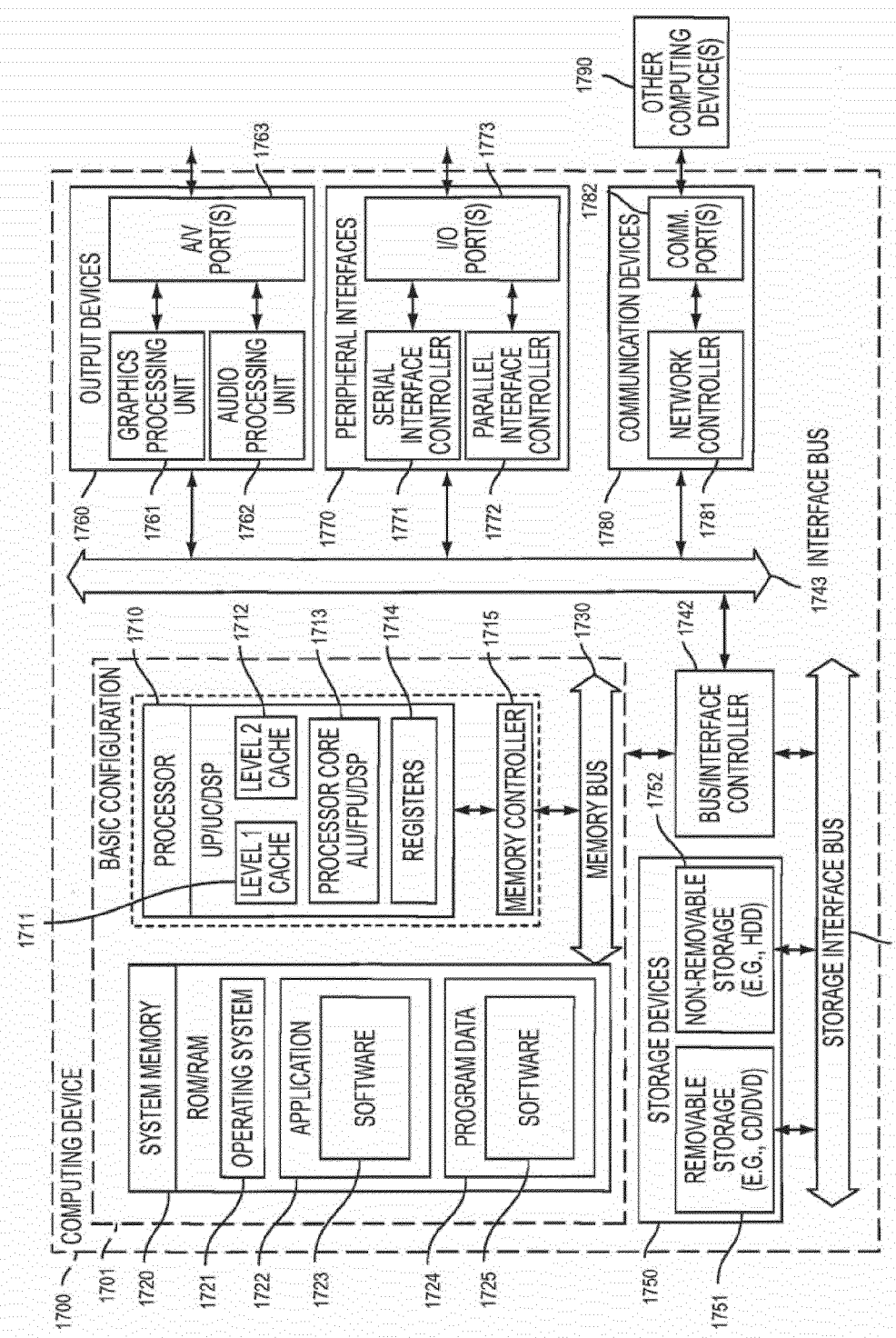
FIG. 5 is an example schematic illustration of an embodiment of a system for performing methods in accordance with embodiments of the present invention.

FIG. 5 is a block diagram illustrating an example computing device 1700 that is arranged for the method for formation evaluation of wireline and LWD Log data in accordance with the present disclosure. In a very basic configuration 1701, computing device 1700 typically includes one or more processors 1710 and a system memory 1720. A memory bus 1730 may be used for communicating between processor 1710 and system memory 1720.

Depending on the desired configuration, processor 1710 may be of any type including but not limited to a microprocessor (µP), a microcontroller (µC), a digital signal processor (DSP), or any combination thereof. Processor 1710 may include one more levels of caching, such as a level one cache 1711 and a level two cache 1712, a processor core 1713, and registers 1714. An example processor core 1713 may include an arithmetic logic unit (ALU), a floating point unit (FPU), a digital signal processing core (DSP Core), or any combination thereof. An example memory controller 1715 may also be used with processor 1710, or in some implementations memory controller 1715 may be an internal part of processor 1710.

Depending on the desired configuration, system memory 1720 may be of any type including but not limited to volatile memory (such as RAM), non-volatile memory (such as ROM, flash memory, etc.) or any combination thereof System memory 1720 may include an operating system 1721, one or more applications 1722, and program data 1724. Application 1722 may include a method algorithm for formation evaluation 1723 that is arranged to perform the functions as described with respect to processes of FIGS. 1-4. Program data 1724 may include wireline and/or LWD log data 1725 that may be useful for configuring routing algorithm as is described herein. In some embodiments, application 1722 may be arranged to operate with program data 1724 on operating system 1721 such that implementations of formation method may be provided as described herein. This described basic configuration 1701 is illustrated in FIG. 17 by those components within the inner dashed line.

Computing device 1700 may have additional features or functionality, and additional interfaces to facilitate communications between basic configuration 1701 and any required devices and interfaces. For example, a bus/interface controller 1742 may be used to facilitate communications between basic configuration 1701 and one or more data storage devices 1750 via a storage interface bus 1741. Data storage devices 1750 may be removable storage devices 1751, non-removable storage devices 1752, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1720, removable storage devices 1751 and non-removable storage devices 1752 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1700. Any such computer storage media may be part of computing device 1700.

Computing device 1700 may also include an interface bus 1742 for facilitating communication from various interface devices (e.g., output devices 1760, peripheral interfaces 1770, and communication devices 1780) to basic configuration 1701 via bus/interface controller 1742. Example output devices 1760 include a graphics processing unit 1761 and an audio processing unit 1762, which may be configured to communicate to various external devices such as a display or speakers via one or more A/V ports 1763. Example peripheral interfaces 1770 include a serial interface controller 1771 or a parallel interface controller 1772, which may be configured to communicate with external devices such as input devices (e.g., keyboard, mouse, pen, voice input device, touch input device, etc.) or other peripheral devices (e.g., printer, scanner, etc.) via one or more I/O ports 1773. An example communication device 1780 includes a network controller 1781, which may be arranged to facilitate communications with one or more other computing devices 1790 over a network communication link via one or more communication ports 1782.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1700 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method of characterizing elastic properties of a subsurface formation at various fluid saturation conditions, the method comprising:
   estimating densities and bulk moduli of fluids and surrounding rock matrix material present in an invaded zone around a wellbore and beyond the invaded zone to record a set of log curves of density and bulk modulus of the fluids and the surrounding rock matrix material present in the invaded zones and beyond the invaded zone versus depth;

recording a set of shale trend compaction curves in each wellbore;

solving a set of response equations for rock and fluid volumes based on the recorded set of log curves and shale trend compaction curves to compute lithology, porosity and hydrocarbon saturation to build computer models to estimate hydrocarbon saturation for the rock matrix material penetrated in the wellbore; and using the estimated densities and the bulk moduli of the fluids and the rock matrix material near the wellbore, the shale trend compaction curves and the computed lithology, porosity and hydrocarbon saturation near the wellbore to characterize elastic properties of a subsurface formation at various fluid saturation conditions.

2. The computer-implemented method according to claim 1, wherein the estimated densities and bulk moduli of the surrounding rock matrix are determined based on one or more wireline and logging-while-drilling logs.

3. The computer-implemented method according to claim 2, further comprising:

editing the wireline and logging-while-drilling logs to correct for depth mismatching.

4. The computer-implemented method according to claim 3, wherein the one or more sonic logs is obtained from the wireline and logging-while-drilling logs.

5. The computer-implemented method according to claim 4, further comprising:

correcting the obtained one or more sonic logs for anisotropy if the sonic logs are obtained from deviated boreholes.

6. The computer-implemented method according to claim 5, further comprising: normalizing the shale trend compaction curves with respect to a common datum in each wellbore.

7. The computer-implemented method according to claim 6, wherein the shale trend compaction curves include curves of at least one of density, neutron porosity, compressional sonic and resistivity.

8. The computer-implemented method according to claim 7, wherein the densities and bulk moduli of the fluids present in the invaded zone and reservoir, and other hypothecated aqueous or hydrocarbon fluids of interest are estimated from pressure and temperature.

9. The computer-implemented method according to claim 7, wherein the estimated densities and bulk moduli of fluids are determined based on laboratory measurements or established models.

10. The computer-implemented method according to claim 6, wherein the fluids present in the invaded zone include formation water, hydrocarbon and drilling mud filtrate.

11. The computer-implemented method according to claim 6, further comprising:

producing rock and mineral volume fractions based on the solved set of response equations for rock and fluid volumes for a predetermined depth interval below the wellbore.

12. The computer-implemented method according to claim 11, further comprising:

creating a regional sand porosity compaction trend curves based on the solved set of response equations.

13. The computer-implemented method according to claim 12, further comprising:

creating a data rehabilitation model based on the solved set of response equations.

14. The computer-implemented method according to claim 13, wherein typical reservoir saturations are modeled to represent oil or gas as a continuous phase or trapped gas at low saturation.

15. The computer-implemented method according to claim 14, wherein the estimated densities and bulk moduli of the surrounding rock matrix are determined based on the transformation of data from one or more wireline and logging-while-drilling logs to interpreted lithology or mineralogy.

16. The computer-implemented method according to claim 15, wherein fluid substitution is performed by inputting density and bulk modulus trends for fluids and their individual saturations, bulk moduli and volume fractions of each rock type, density, compressional and shear wave slowness or velocity of the formation, and cutoffs to identify intervals where fluid substitution is not to be done.

17. The computer-implemented method according to claim 16, further comprising:

producing quality control curves based on the fluid substitution results.

18. The computer-implemented method according to claim 17, wherein the quality control curves are produced for individual wells or across multiple wells.

19. The computer-implemented method according to claim 17, wherein the quality control curves are displayed as scatter plots including density, shear wave slowness or velocity, bulk modulus, compressional wave slowness or velocity, compressional impedance and compressional to shear wave velocity, Poisson's ratio against effective porosity or shale fraction.

20. The computer-implemented method according to claim 15, further comprising:

determining local Greenberg-Castagna coefficients to estimate shear wave slowness or shear wave velocity for shale, sand and any other rock types present.

21. The computer-implemented method according to claim 20, wherein simultaneous fluid substitution and shear velocity estimation is performed by inputting density and bulk modulus trends for fluids and their individual saturations, bulk moduli and volume fractions of each rock type, density and compressional wave slowness or velocity of the formation, Greenberg-Castagna coefficients for all rock types, and cutoffs to identify intervals where fluid substitution is not to be done.

22. The computer-implemented method according to claim 21, further comprising:

producing quality control curves based on the fluid substitution results.

23. The computer-implemented method according to claim 22, wherein the quality control curves are produced for individual wells or across multiple wells.

24. The computer-implemented method according to claim 22, wherein the quality control curves are displayed as scatter plots including density, shear wave slowness or velocity, bulk modulus, compressional wave slowness or velocity, compressional impedance and compressional to shear wave velocity, Poisson's ratio against effective porosity or shale fraction.

25. The computer-implemented method according to claim 20, further comprising determining local Greenberg-Castagna coefficients to estimate shear slowness of laminated shale beds present in a thinly-laminated formation.

26. The computer-implemented method according to claim 25, wherein fluid substitution is performed using a laminated model where the dependence of the elastic properties of the porous sand laminations on fluid content is modeled using an iterative optimization of Greenberg-Castagna and Gassmann models, by inputting density and bulk modulus trends for fluids and their individual saturations, bulk moduli and volume fractions of the sand and shale laminations, density, compressional and shear wave slowness or velocity of the formation, and cutoffs to identify intervals where fluid substitution is not to be done.

27. The computer-implemented method according to claim 26, further comprising:
producing quality control curves based on the fluid substitution results.

28. The computer-implemented method according to claim 27 wherein the quality control curves are produced for individual wells or across multiple wells.

29. The computer-implemented method according to claim 27, wherein the quality control curves are displayed as scatter plots including density, shear wave slowness or velocity, bulk modulus, compressional wave slowness or velocity, compressional impedance and compressional to shear wave velocity, Poisson's ratio against effective porosity or shale fraction.

30. The computer-implemented method according to claim 24, wherein fluid substitution is performed using a laminated model where the dependence of the elastic properties of the porous sand laminations on fluid content is modeled using an iterative optimization of Greenberg-Castagna and Gassmann models, and the estimation of the shear velocity of the shale laminations is achieved using the Greenberg-Castagna equation, by inputting density and bulk modulus trends for fluids and their individual saturations, bulk moduli and volume fractions of the sand and shale laminations, density and compressional or velocity of the formation, and cutoffs to identify intervals where fluid substitution is not to be done.

31. The computer-implemented method according to claim 30, further comprising:
producing quality control curves based on the fluid substitution results.

32. The computer-implemented method according to claim 31, wherein the quality control curves are produced for individual wells or across multiple wells.

33. The computer-implemented method according to claim 31, wherein the quality control curves are displayed as scatter plots including density, shear wave slowness or velocity, bulk modulus, compressional wave slowness or velocity, compressional impedance and compressional to shear wave velocity, Poisson's ratio against effective porosity or shale fraction.

34. A system for performing a method of characterizing elastic properties of a subsurface formation at various fluid saturation conditions comprising:
a data storage device having computer readable data including data relating to the plurality of well logs; and
a processor, configured and arranged to execute machine executable instructions stored in a processor accessible memory for performing a method comprising:
estimating densities and bulk moduli of fluids and surrounding rock matrix material present in an invaded zone around a wellbore and beyond the invaded zone to record a set of log curves of density and bulk modulus of the fluids and the surrounding rock matrix material present in the invaded zones and beyond the invaded zone versus depth;
recording a set of shale trend compaction curves in each wellbore;
solving a set of response equations for rock and fluid volumes based on the recorded set of log curves and shale trend compaction curves to compute lithology, porosity and hydrocarbon saturation to build computer models to estimate hydrocarbon saturation for the rock matrix material penetrated in the wellbore; and
using the estimated densities and the bulk moduli of the fluids and the rock matrix material near the wellbore, the shale trend compaction curves and the computed lithology, porosity and hydrocarbon saturation near the wellbore to characterize elastic properties of a subsurface formation at various fluid saturation conditions.

35. A system as in claim 34, further comprising a user interface configured and arranged to allow a user to input parameters for controlling the method.

* * * * *